United States Patent [19]

Toriuchi et al.

[11] Patent Number: 4,560,645

[45] Date of Patent: Dec. 24, 1985

[54] COLOR PHOTOGRAPHIC LIGHT-SENSITIVE MATERIAL

[75] Inventors: Masaharu Toriuchi; Shigetoshi Ono, both of Kanagawa, Japan

[73] Assignee: Fuji Photo Film Co., Ltd., Kanagawa, Japan

[21] Appl. No.: 658,925

[22] Filed: Oct. 9, 1984

[30] Foreign Application Priority Data

Oct. 6, 1983 [JP] Japan .................................. 58-187406

[51] Int. Cl.[4] .......................... G03C 1/40; G03C 5/54
[52] U.S. Cl. ..................................... 430/562; 430/223
[58] Field of Search ............... 430/222, 223, 225, 226, 430/562

[56] References Cited

U.S. PATENT DOCUMENTS

| 3,954,476 | 5/1976 | Krutak et al. | 430/223 |
| 4,250,246 | 2/1981 | Itoh et al. | 430/223 |
| 4,268,606 | 5/1981 | Haase et al. | 430/223 |
| 4,358,526 | 11/1982 | Fujita et al. | 430/223 |

Primary Examiner—Richard L. Schilling
Attorney, Agent, or Firm—Sughrue, Mion, Zinn, Macpeak & Seas

[57] ABSTRACT

A color photographic light-sensitive material is described, containing at least one light-sensitive silver halide emulsion layer and associated with at least one of said emulsion layer at least one dye-providing compound represented by the following general formula (I):

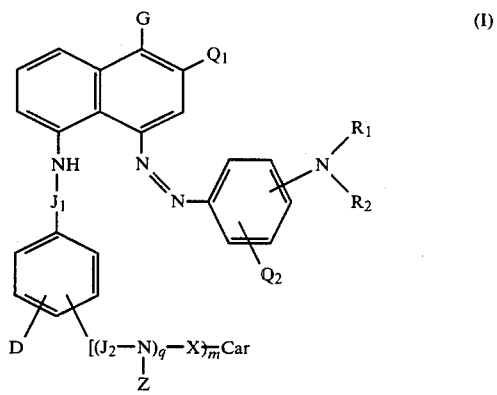

wherein $Q_1$, G, $R_1$, $R_2$, $Q_2$, $J_1$, $J_2$, D, Z, X, Car, m and q are defined as herein.

The color photographic light-sensitive material provides a transfer color image with a good hue and a good sharpness.

18 Claims, No Drawings

COLOR PHOTOGRAPHIC LIGHT-SENSITIVE MATERIAL

FIELD OF THE INVENTION

This invention relates to a color photographic light-sensitive material and, more particularly, to a color diffusion transfer process photographic light-sensitive material containing a novel dye-providing compound. Still more particularly, it pertains to a light-sensitive sheet for a color diffusion transfer process containing a novel magenta dye-providing compound.

BACKGROUND OF THE INVENTION

Color diffusion transfer processes generally involve the use of a photographic element comprising a support, at least one silver halide emulsion layer, and a dye-providing compound which is contained in or contiguous to said layer. The dye-providing compound is typically represented by the chemical structural formula of Car-Dye [wherein Dye represents a dye moiety or a precursor thereof, and Car represents a moiety which, as a function of silver development under an alkaline contdition, forms or releases a substance (dye compound) having a mobility different from that of the dye-providing compound, and can be thought of as a carrier which may be attached to the dye moiety optionally through a linking ground]. This Car moiety brings about the change in mobility of the dye compound in proportion to development and, with dye-providing compounds that are diffusion-resistant even under alkaline conditions, diffusible dyes are released in proportion to the degree of development (i.e. according to a progress of developement or reverse progress of development) or are rendered soluble in proportion to the degree of development, and thus diffusible. In contrast, with dye-providing compounds which are diffusible under alkaline conditions, the dyes are rendered insoluble in proportion to the degree of development, and thus non-diffusible. Typical examples thereof are dye developers.

As the typical examples of the former, there are dye-releasing redox compounds described in Japanese Patent Application (OPI) Nos. 33826/73 (corresponding to U.S. Pat. No. 3,928,312), 114424/74, 126331/74, 126332/74, 115528/75, 104343/76 (corresponding to U.S. Pat. No. 4,198,235), U.S. Pat. No. 3,954,476, Research Disclosure, 13024 (1975) and 16475 (1977). The term "dye-releasing redox compounds" as used herein means compounds wherein a group, called a redox parent nucleus (corresponding to the foregoing Car), and a dye moiety (including a precursor thereof) are attached to each other. The redox parent nucleus is initially immobilized by the function of a ballast group bound thereto and, upon redox reaction under alkaline conditions, undergoes cleavage to release a dye moiety-containing compound (dye compound). As a result, this dye compound diffuses into an image-receiving layer to form a transferred dye. (The term "OPI" as used herein refers to a published unexamined Japanese patent application.)

Of the redox parent nuclei, there are those which are called "positive-working" type described in, for example, Japanese Patent Application (OPI) Nos. 110827/78, 110828/78, 164342/81, etc. Some release dye compounds in an inverse gradation to that of developed silver, i.e., inverse imagewise.

As the dye-providing compounds, yellow dye-providing compounds, magenta dye-providing compounds, and cyan dye-providing compounds are known. Examples of the magenta dye-releasing redox compounds are described in Japanese Patent Application (OPI) Nos. 115528/75, 114424/74, U.S. Pat. Nos. 3932380, 3931144, etc.

However, magenta dye-releasing redox compounds described in the preceding literature have the disadvantages that they show a poor color reproducibility, since the magenta dye-releasing redox compounds provide transfer images having insufficient hue, that they provide dyes having insufficient diffusibility to cause prolonged image-completing time, that they lower the efficiency of light absorption of an underlying red-sensitive emulsion (leading to reduction in sensitivity), since their spectral absorption in a coat before photographic processing expands to a longer wave-length region, and that they provide transfer images having poor sharpness. For example, with respect to the hue of the transfer image, the maximum absorption wave-length ($\lambda$max) and the foot shape of absorption spectrum are of importance. As to absorption shifted to a shorter wave-length side fails to present dark red, whereas absorption shifted to a longer wave-length side fails to present bright red. As to the foog shape of absorption spectrum, broad absorption spectrum at the foot portion can reproduce only a stained color. It has been difficult to develop magenta dyes having an absorption spectrum with both suitable $\lambda$max and a good foot shape, by conventionally known techniques.

With respect to spectral absorption properties in coatings before photographic processing, conventionally known magenta dyes function as unfavorable filters for an underlying red-sensitive emulsion since they have a magenta color in the coatings, and therefore orange to yellow light rays of about 600 nm do not reach the red-sensitive emulsion. Thus, it is difficult to reproduce such color, and such color reduces sensitivity of red-sensitive emulsion and causes serious changes in color reproduction depending upon the color temperature of the light source used.

It has heretofore been eagerly desired to solve or overcome these problems or defects at the same time.

Japanese Patent Application (OPI) No. 4028/80 describes magenta dye-releasing redox compounds in which an amino group derivative is attached to a phenylene group bound to an azo group constituting a dye moiety and a redox parent nucleus is attached to the same phenylene group directly or through a linking group. The redox compounds are considerably excellent dye-providing compounds in that they form dyes that undergo less fading in darkness or by light, and they form dyes with good hue. However, this type of redox compounds have problems with synthesis adaptability and sharpness of the transfer dye image. Thus, these problems have been desired to be solved.

SUMMARY OF THE INVENTION

It is, therefore, an object of the present invention to provide magenta dye-providing compounds which give a transfer color image with a good hue (i.e., with maximum absorption in a suitable region and an absorption wave form having good foot shape).

Another object of the present invention is to provide magenta dye-providing compounds having an absorption in a suitable region of wavelength in coatings prior to photographic processing.

A further object of the present invention is to provide magenta dye-providing compounds which, as a function of development, form or release diffusible dye compounds having good diffusibility and provide transfer images having good sharpness.

Still a further object of the present invention is to provide magenta dye-providing compounds having good synthesis adaptability.

Still a further object of the present invention is to provide a silver halide color photographic light-sensitive material containing a magenta dye-providing compound with excellent properties as described above.

As a result of intensive investigations, the inventors have found that these objects can be effectively attained by a color photographic light-sensitive material which has at least one light-sensitive silver halide emulsion layer, and in which at least one of said emulsion layers is associated with at least one dye-providing compound represented by the following general formula (I):

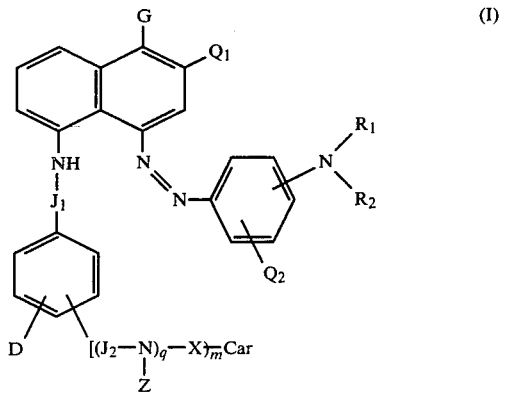

wherein $Q_1$ represents a hydrogen atom, a halogen atom, a sulfamoyl group represented by $-SO_2NR_3R_4$, an $SO_2R_a$ group, a $COOR_3$ group or a $-CONR_3R_4$ group, wherein $R_3$ and $R_4$ may be the same as, or different from, each other and each represents a hydrogen atom or Ra and wherein Ra represents an alkyl group, a substituted alkyl group, an aralkyl group, a substituted aralkyl group, an aryl group or a substituted aryl group, or $R_3$ and $R_4$ may bind together directly or through a nitrogen or oxygen atom to form a ring;

G represents a hydroxy group, a salt thereof, or $-O-PR$, wherein PR represents a protecting group for $-O-$ undergoing cleavage of the $O-PR$ bond under alkaline conditions;

$R_1$ and $R_2$ may be the same as, or different from, each other and each represents an alkyl group, a substituted alkyl group, an aryl group or a substituted aryl group, or $R_1$ and $R_2$ together represent atoms necessary for forming a 5- or 6-membered hetero ring;

$Q_2$ represents a sulfonic acid group, a salt thereof, or a sulfamoyl group represented by $-SO_2NR_5R_6$, wherein $R_5$ and $R_6$ are the same as defined for $R_3$ and $R_4$ in $Q_1$;

$J_1$ and $J_2$ each represents a sulfonyl group or a carbonyl group;

D represents a hydrogen atom, a halogen atom, a carboxyl group, a sulfo group, an alkyl group, a substituted alkyl group, an alkoxy group, a substituted alkoxy group, an aryl group, a substituted aryl group or an amino group represented by $-NR_7R_8$, wherein $R_7$ and $R_8$ are the same as defined for $R_3$ and $R_4$ on $Q_1$;

Z represents a hydrogen atom, an alkyl group or a substituted alkyl group;

X represents a bivalent linking group of the formula $-A_1-L_n-(A_2)_p-$, wherein $A_1$ and $A_2$ may be the same or different and each represents an alkylene group, a substituted alkylene group, an aralkylene group, a substituted aralkylene group, a phenylene group or a substituted phenylene group, L represents a bivalent group selected from oxy, carbonyl, carboxyamido, carbamoyl, sulfonamido, sulfamoyl, sulfinyl and sulfonyl, and p and n each represents 0 or 1;

m and q each represents 0 or 1; and

Car represents a moiety which, as a function of silver development, forms or releases a substance having a mobility different from that of the dye-providing compound.

DETAILED DESCRIPTION OF THE INVENTION

In the above general formula (I), important structural features are that a substituted amino group ($-NR_1R_2$) exists in an azobenzene ring, and that Car is attached to a phenylene or substituted phenylene group bound to $-NHJ_1-$ group at the 5-position of a naphthol ring.

Existence of the amino group and attachment of Car to the 5-position of a naphthol ring are responsible for the remarkable improved effects, unexpected from the prior art, on hud of the transfer image, hue of the compounds in coatings before photographic processing (filter effect), diffusibility of released fye, sharpness of transfer image, and the compounds' good synthesis adaptability.

As to the hue of transfer image, maximum absorption wave-length ($\lambda$max) and foot shape of absorption spectrum (narrowness of the absorption spectrum) are improtant as preveiously mentioned. It is believed, based on calculations of the color reproducible region using a computer and accumulated data on actual photographing tests, that ideal magenta dyes have a $\lambda$max between 550 and 555 nm. As to foot shape of absorption spectrum, conventional compounds have been desired to be much more improved. Prior art dyes have a well adjusted $\lambda$max, but fail to show a good foot shape. On the other hand, the dyes of the present invention have a $\lambda$max in an ideal position and show a good foot shape. In calculation of color reproducible regions using a computer and data on actual photographing tests, reproducible regions of blue and red, particularly red, are expanded by the use of the dye-providing compound of the present invention. Thus, the compounds of the present invention enable reproduction of vivid, clear, and bright color.

In contrast, as has been previously mentioned, the color of the compound in coatings prior to photographic processing is also of importance in the point of sensitivity and color reproduction (spectral sensitivity) for an underlying red-sensitive emulsion, which is well known in the art as the "filtering effect". Conventional magenta dye-providing compounds absorb light rays of a considerably longer wavelength length region in coatings, and therefore absorb light rays of an orange region to which an underlying red-sensitive emulsion should respond. Thus, they provide poor color reproducibility in an orange region, show unfavorable dependence upon color temperature of a light source used, and seriously reduce sensitivity. Conventional magenta dye-providing compounds designed to absorb light rays of a shorter wavelength region in order to avoid absorption of the orange region light rays provide a transfer hue of a shorter wavelength region, thus being unsatisfactory. On the other hand, the magenta dye-providing compounds of the present invention absorb light rays of enough of the shorter wavelength region in coatings and, after diffusion transfer procedure, provide a transfer hue of enough of the longer wave-length region, thus solving the two extremely difficult problems with the conventional magenta dye-providing compounds. Superiority in both the transfer image hue and hue in coatings leads to the expansion of a color-reproducible region.

As to diffusibility of dye, which is an extremely important factor for shortening the time required for appearance of an image or image-completing time (transfer rate), conventional dyes with an excellent diffusibility, provide poor sharpness of image (poor resolving power) though their transfer rate is fast. This may be attributed to the turbulence of mordantability in an image-receiving layer due to decreased mordantability. On the other hand, dyes released from the dye-providing compounds of the present invention show a fast transfer rate and provide good image sharpness, thus showing good mordantability for the good diffusibility. In this point, too, the magenta dye-providing compounds of the present invention have been found to possess excellent properties not expected from the prior art.

As to synthesis adaptability, conventional techniques of linking Car to the azobenzene moiety have the disadvantage that the yield of the reaction of linking the dye moiety to the Car moiety is so low that synthesis of the dyes has been difficult. This low reaction yield is liable to leave unreacted dye moieties, which form water-soluble, colored impurities, causing a rise in minimum density (Dmin) of the transfer image. On the other hand, in the synthesis of the magenta dye-providing compounds of the present invention, reaction yield is so high that compounds with high quality can be easily obtained, which leads to a remarkable reduction in Dmin.

As has been described above, photographic light-sensitive materials using the magenta dye-providing compounds of the present invention provide a transfer image of excellent hue, show high sensitivity and excellent color reproducibility, and give photographic pictures with low Dmin (less fog) due to the remarkable effects not expected from the prior art.

The magenta dye-providing compounds of the present invention are described in more detail below.

The group of

is preferably in the 4- or 6-position with respect to the azo group. The alkyl group represented by $R_1$ and $R_2$ may be straight, branched, or cyclic. Preferred examples thereof include alkyl groups containing 1 to 6 (more preferably 1 to 4) carbon atoms and substituted alkyl groups such as those containing 1 to 10 (more preferably 1 to 5) carbon atoms and substituted by an alkoxy group, a halogen atom, a hydroxy group, an amino group, an alkylamino group, or the like (e.g., a methoxyethoxyethyl group, a methoxyethyl group, a chloroethyl group, etc.). The sum of the carbon atoms contained in $R_1$ and $R_2$ is preferably not more than 8. As the atoms necessary for forming a 5- or 6-membered hetero ring (when $R_1$ and $R_2$ are bound together), there are alkylene groups which can complete a 5- or 6-membered ring together with a nitrogen atom (e.g., piperidine, 2,6-dimethylpiperidine, pyrrolidine, etc.) and carbon chains containing an oxygen atom or a nitrogen atom (e.g., —CH$_2$CH$_2$—O—CH$_2$CH$_2$—, —CH$_2$CH(CH$_3$)—O—CH(CH$_3$)CH$_2$—, —CH(CH$_3$)CH$_2$—O—CH$_2$CH(CH$_3$)—, —CH$_2$CH$_2$—N—CH$_2$CH$_2$—, etc.). Particularly preferably,

represents a morpholino group.

Where $Q_1$ represents a sulfamoyl group of —SO$_2$NR$_3$R$_4$, preferred examples of $R_3$ and $R_4$ include a hydrogen atom, an alkyl group containing 1 to 10 (more preferably 1 to 4) carbon atoms, a substituted alkyl group containing 1 to 10 (more preferably 1 to 4) carbon atoms in the alkyl moiety an aralkyl group preferably having 7 or 8 carbon atoms, a phenyl group, and substituted phenyl group containing 6 to 9 carbon atoms, or $R_3$ and $R_4$ may be bound together to form a 5- or 6-membered ring optionally including a nitrogen atom or an oxygen atom as previously mentioned for $R_1$ and $R_2$. Particularly preferably, at least one of $R_3$ and $R_4$ is branched (secondary or tertiary). The same applies to —CONR$_3$R$_4$. As the substituents for the substituted alkyl group and the substituted aryl group, there are illustrated a hydroxy group, a hydroxyalkyl group, an alkyl group, an alkoxy group, an amino group, an alkylamino group, a hydroxyalkylamino group, a halogen atom, a cyano group, a sulfamoyl group (including N-substituted sulfamoyl groups), a carbamoyl group (including N-substituted carbamoyl groups) etc. Preferably $Q_1$ represents a group of —SO$_2$NR$_3$R$_4$ or a group of —CONR$_3$R$_4$, and most preferably a group of —SO$_2$NR$_3$R$_4$.

Where $Q_2$ represents a sulfamoyl group of —SO$_2$NR$_5$R$_6$, the sum of the carbon atoms contained in $R_5$ and $R_6$ is preferably not more than 4, more preferably not more than 2. In view of obtaining high diffusibility of the dye, at least one of $R_3$ and $R_4$ particularly preferably represents a hydrogen atom.

Examples of G include a hydroxy group and a salt thereof such as an alkali metal salt (e.g., —O$^\ominus$Li$^\oplus$, —O$^\ominus$K$^\oplus$, —O$^\ominus$Na$^\oplus$, etc.) or an ammonium salt (e.g., —O$^\ominus$NH$_4^\oplus$, —O$^\ominus$NHC(CH$_3$)$_3^\oplus$, —O$^\ominus$N(C$_2$H$_5$)$_4^\oplus$, etc.). Further, G may be a hydrolyzable acyloxy group having a group represented by —O—PR such as

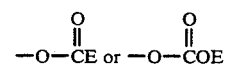

(wherein E represents an alkyl group, a substituted alkyl group, a phenyl group or a substituted phenyl group; substituents of substituted alkyl or phenyl group being selected from the previously mentioned substituents), may be a blocking group of intramolecular nucleophilic substitution type as described in Japanese Patent Application (OPI) No. 5330/80, or may be a blocking group described in Japanese Patent Application (OPI) No. 158638/82, U.S. Pat. No. 3,698,898, etc. In short, those groups which are stable during storage and undergo rapid cleavage under alkaline conditions may be suitably used in the present invention. Preferably, G is a hydroxy group, an acyloxy group or

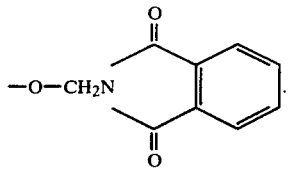

$J_1$ and $J_2$ each represents a sulfonyl group or a carbonyl group, preferably a sulfonyl group.

Z represents a hydrogen atom, a substituted or unsubstituted alkyl group wherein alkyl moiety has 1 to 4 carbon atoms (substituents being, for example, those previously mentioned), particularly preferably a hydrogen atom.

As the substituted arylene group of $A_1$ or $A_2$ for X, those which contain 6 to 12 carbon atoms are preferable. Specific examples thereof include substituted phenylene groups substituted by, for example, an alkoxy group having preferably 1 to 6 carbon atoms more preferably 1 to 4 carbon atoms (e.g., a methoxy group, an ethoxy group, etc.), an alkoxyalkoxy group having preferably 3 to 6 carbon atoms, more preferably 3 to 4 carbon atoms (e.g., a methoxyethoxy group, etc.), an alkyl group having preferably 1 to 6 carbon atoms, more preferably 1 to 4 carbon atoms (e.g., a methyl group, an ethyl group, etc.), an amino group and a substituted amino group which substituent is preferably an alkyl group having 1 to 4 carbon atoms and a group forming a morpholino group together with a nitrogen atom of the amino group. The substituents for the substituted phenylene groups may have two or more such substituents. Preferably, X is a phenylene group, a group of

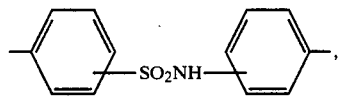

or a substituted group of those having an alkoxyalkoxy group or a morpholino group as substituent.

D preferably represents a substituent containing 6 or less carbon atoms or a hydrogen atom, particularly preferably a hydrogen atom.

Preferable dye-providing compounds of the present invention are those in which n represents 1 and p represents 0 and, more preferably, q and m represent 1. However, taking diffusibility of released dye into consideration, m preferably represents 0.

Car represents a moiety which, as a function of development, forms or releases a substance (dye compound or its precursor) having a mobility different from that of the starting dye-providing compound through a reduction reaction or other chemical reaction, and which may be a polyvalent metal complex, including a so-called "negative-working type" which undergoes cleavage as a result of oxidation caused by development of silver and "positive-working type" which undergo cleavage in portions where no development of silver has taken place and does not undergo cleavage in portions where development of silver has taken place.

Car of any of the "negative-working type" and "positive-working type" is suited for the magenta dye-providing compounds of the present invention. The cleaved dye moiety terminal varies depending upon the kind of Car (for example, Dye-SO$_2$NH$_2$, Dye-OH, Dye-NH$_2$, etc.). However, whatever is the terminal of the cleaved dye, the dye-providing compounds of the present invention do not exert detrimental influences on a resulting hue since the terminal is spaced from the chromophore or auxochrome of the dye, which is one great aspect of the compounds. In contrast, a conventional structure wherein Car is attached to an azobenzene moiety as described in the general formula (I) of, for example, Japanese Patent Application (OPI) Nos. 4028/80, 161332/79 or 115528/75 undergoes a serious change in hue by varying the terminal. In the structure of the present invention, the structure of the dye moiety can be selected independently from the kind of Car.

Examples of negative-working Car are described in, for example, U.S. Pat. Nos. 4,135,929, 4,053,312, 4,336,322, Japanese Patent Application (OPI) Nos. 33826/73 (corresponding to U.S. Pat. No. 3,928,312), 104343/76 (corresponding to U.S. Pat. No. 4,198,235), 46730/78, 130122/79, 113624/76 (corresponding to U.S. Pat. No. 4,055,428), 12642/81, 16113/81, 4043/82, 650/82, 20735/82, 54021/79, 71072/81, etc. Specific examples thereof include the following N-substituted sulfamoyl groups (the substituent being preferably an aryl group) which, however, do not limit the present invention in any way.

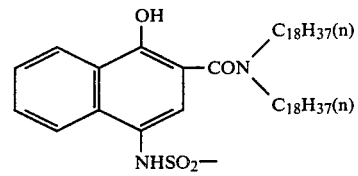

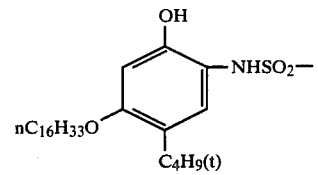

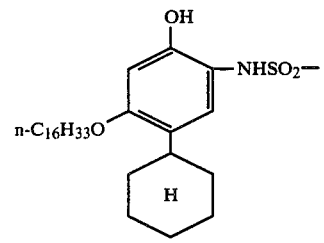

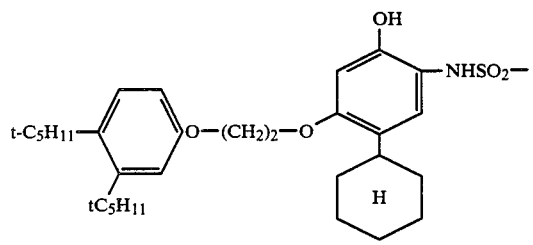

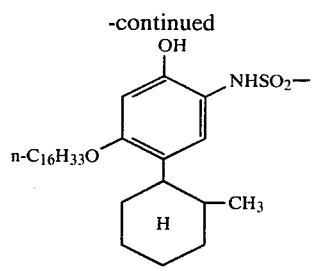

On the other hand, examples of positive-working Car are described in, for example, U.S. Pat. Nos. 4,199,354, 4,199,355, 4,139,379, 4,139,389, 3,719,489, 4,098,783, Japanese Patent Application (OPI) Nos. 11628/74 (corresponding to U.S. Pat. No. 3,421,964), 63618/76 (corresponding to U.S. Pat. No. 3,980,479), 69033/78, 130927/79, 164342/81, 4819/77 (corresponding to U.S. Pat. No. 4,199,355), Japanese Patent Application No. 60289/83, etc. Of them, particularly preferred specific examples are those illustrated below which, however, do not limit the present invention in any way.

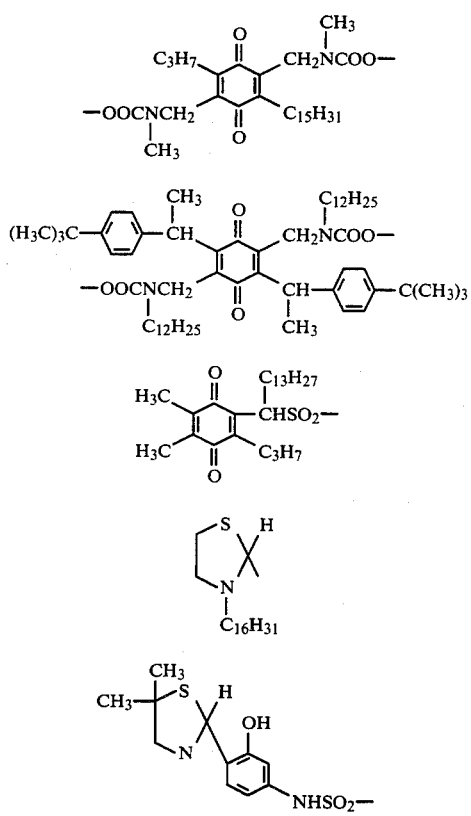

Of these positive-working dye-providing compounds, those which release dyes upon reduction, typically exemplified by having a quinone skeleton, are known to be used in combination with non-diffusible, electron donative compounds (well known as ED compounds) or their precursors. Examples of the ED compounds are described in, for example, U.S. Pat. Nos. 4,263,393, 4,278,750, Japanese Patent Application (OPI) No. 138736/81, etc.

Positive-working, dye-providing compounds of the present invention are suitably used in combination with the ED compounds.

Also, the positive-working, dye-providing compounds may be those of the type which contain an electron-donative moiety within the molecule and release a dye by intramolecular oxidation-reduction reaction.

Of the magenta dye-providing compounds of the present invention, typical examples of magenta dye-releasing redox compounds are illustrated below.

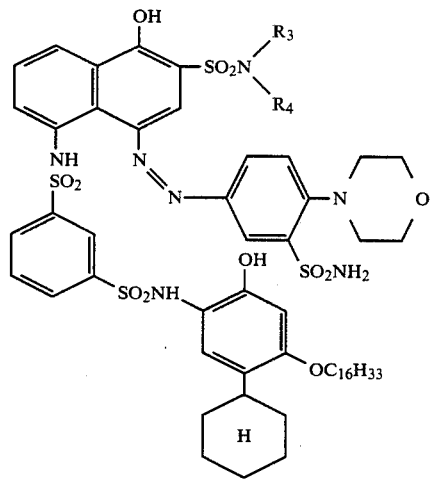

| Compound No. | $R_3$ | $R_4$ |
| --- | --- | --- |
| 1 | $CH_3$ | $CH_3$ |
| 2 | $C_2H_5$ | $C_2H_5$ |
| 3 | $C_3H_7n$ | $C_3H_7n$ |
| 4 | $C_3H_7iso$ | $C_3H_7iso$ |
| 5 | $C_4H_9iso$ | $C_4H_9iso$ |
| 6 | $C_4H_9tert$ | H |

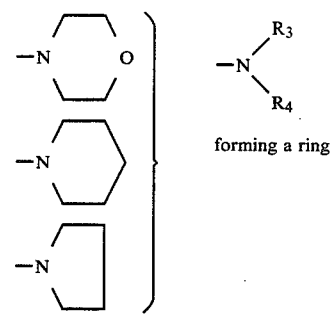

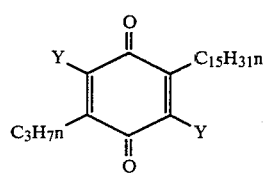

Y represents the following group;

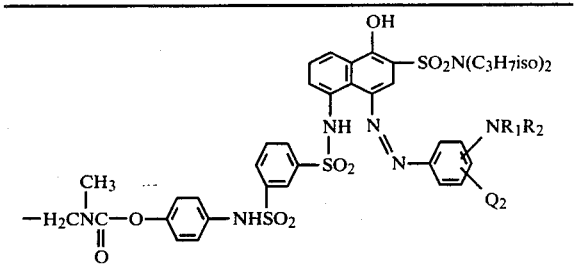
| Compound No. | $-NR_1R_2$ | $Q_2$ |
|---|---|---|
| 10 | P, -N(morpholine) | m-$SO_2NH_2$ |
| 11 | P, -N(morpholine) | m-$SO_3K$ |
| 12 | P, -N(piperidine) | m-$SO_2NHCH_3$ |
| 13 | P, -N(piperazine) | m-$SO_2NH_2$ |
| 14 | P, $-N(C_2H_5)_2$ | m-$SO_2NH_2$ |
| 15 | O, $-N(C_2H_5)_2$ | m-$SO_2NH_2$ |
| 16 | P, -N(morpholine) | m-$SO_2N(CH_3)_2$ |
| 17 | P, $-N(C_2H_4OH)_2$ | m-$SO_2N(CH_3)_2$ |
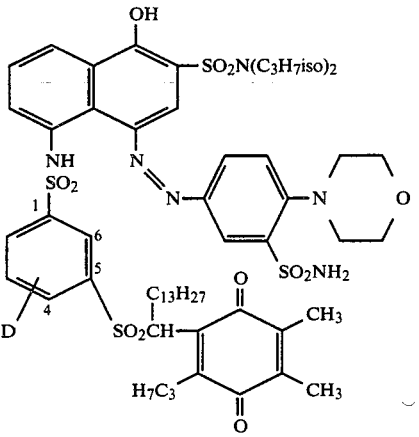
| Compound No. | O |
|---|---|
| 17 | 4-N(morpholine) |
| 18 | 4-$CO_2H$ |
| 19 | 4-$OCH_3$ |
| 20 | 4-$OCH_2CH_2OCH_3$ |
Y' represents the following group;
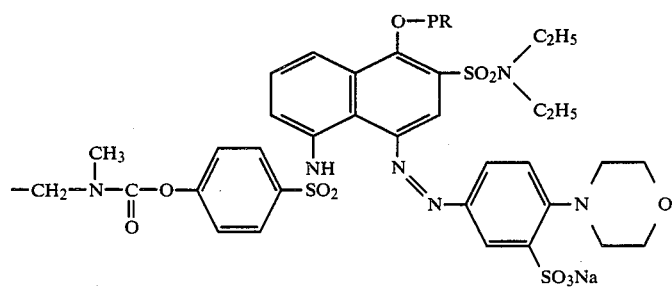

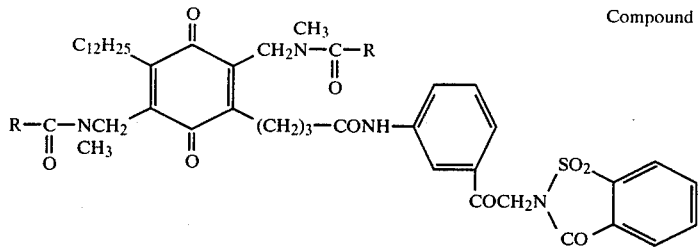

-continued

Compound 24 R =
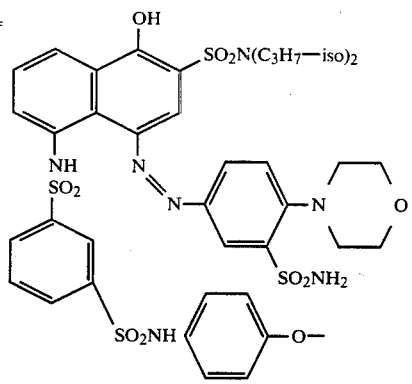

Compound 25
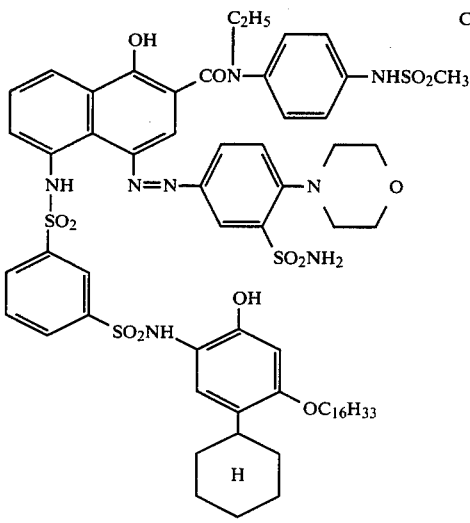

Compound 26
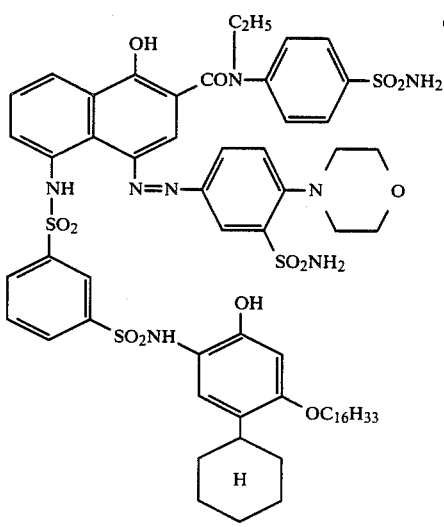

Examples of synthesizing the compounds of the present invention are given below.

SYNTHESIS EXAMPLE 1

Synthesis of Compound 4

(1) Synthesis of potassium 3-{N-[6-(N,N-diisopropylsulfamoyl)-5-hydroxy-8-(4-morpholino-3-sulfamoylphenylazo)]naphthylsulfamoyl}benzenesulfonate:

An aqueous solution of sodium nitrite (0.14 g of sodium nitrite in 2.5 ml of water) was added to a mixture of 0.48 g of 3-amino-6-morpholinobenzenesulfonamide, 10 ml of methanol, 5 ml of water, and 0.5 ml of 35% hydrochloric acid under stirring at 5° C. or lower than that, followed by stirring for 30 minutes to prepare a diazonium solution.

This diazonium solution was added to a stirred mixture of 1.07 g of potassium 3-{N-[6-(N,N-diisopropylsulfamoyl)-5-hydroxy]naphthylsulfamoyl}benzenesulfonate, 10 ml of methanol, 5 ml of methyl cellulose, a sodium hydroxide aqueous solution (0.074 g of sodium hydroxide in 5 ml of water), and 1 g of sodium acetate at 5° C. or lower than that. After stirring the mixture for one hour, 10 ml of 35% hydrochloric acid was added thereto, and crystals formed were collected by filtration to obtain 1.15 g of the end product.

(2) Synthesis of N,N-diisopropyl-[5-(3-chlorosulfonylbenzene)sulfonamido-1-hydroxy-4-(4-morpholino-3-sulfamoylphenylazo)]-2-naphthalenesulfonamide 6.5 ml of N,N-dimethylacetamide was dropwise added to a stirred mixture of 13.5 g of the compound obtained in (1) described above, 130 ml of acetonitrile, and 13 ml of phosphorus oxychloride, then the resulting mixture was stirred for 90 minutes. The reaction solution was poured into 650 ml of water, and crystals precipitated were collected by filtration to obtain 9.2 g of the end product.

(3) Synthesis of Compound 4

A mixture of 4.66 g of 2-amino-4-cyclohexyl-5-hexadecyloxyphenol hydrochloride, 30 ml of N,N-dimethylacetamide, and 5 ml of pyridine was stirred, and 8.3 g of the compound obtained in (2) described above was added thereto. After stirring for one hour, the solution was poured into 200 ml of 5% hydrochloric acid, and crystals precipitated were collected by filtration. Column purification of the crystals using a developing solvent of chloroform/ethyl acetate (4/1) gave 4.0 g of the end product.

SYNTHESIS EXAMPLE 2

Synthesis of Compound 10

A mixture of 10 g of a hydroquinone oxidant Compound 10, 100 ml of methyl chloride, and 5 g of manganese dioxide were stirred at room temperature for 2 hours. After removal of manganese dioxide using sellaite, the solution was concentrated to dryness. Purification of the residue by column chromatography using silica gel gave 3.2 g of the end product.

Other compounds may be easily synthesized according to the above-described processes.

The color photographic light-sensitive material of the present invention may be use in, for example, a thermal development process.

Stratum structure and other additives suited for this process are described in Japanese Patent Application (OPI) No. 58543/83, etc.

In adapting the color photographic light-sensitive material of the present invention to a color diffusion transfer photographic process, there may be employed a peel-apart type structure, an integrated structure as described in Japanese Patent Publication Nos. 16356/71 (corresponding to U.S. Pat. Nos. 3,415,645 and 3,415,646), 33697/73 (corresponding to U.S. Pat. No. 3,594,167), Japanese Patent Application (OPI) No. 13040/75 (corresponding to U.S. Pat. No. 3,993,486), and BP No. 1330524, or a film unit structure which eliminates the peeling procedure as described in Japanese Patent Application (OPI) No. 119345/82 (corresponding to European Pat. No. 53,328). Also, a structure or format of optionally delaminatable, integrated type film unit may also be employed (Japanese Patent Application (OPI) No. 67840/81, etc.).

In any of the above-described formats, the use of a polymeric acid layer protected by a temporary barrier layer which shortens the neutralization timing period at high processing temperatures, such as fused latex polymer described in Japanese Patent Application (OPI) Nos. 145217/77 (corresponding to U.S. Pat. No. 4,056,394), 72622/78 (corresponding to U.S. Pat. No. 4,199,362), 78130/79 (corresponding to U.S. Pat. No. 4,250,243), 138432/79 (corresponding to U.S. Pat. No. 4,256,827), 138433 (corresponding to U.S. Pat. No. 4,268,604), etc. or lactone ring-containing polymers disclosed in Japanese Patent Application (OPI) No. 54341/80 (corresponding to U.S. Pat. No. 4,229,516) or Research Disclosure Vol. 184, No. 18452 (1979), is advantageous in view of expanding the range of employable temperatures.

Light-sensitive silver halide emulsions to be used in the present invention are hydrophilic colloidal dispersions of silver chloride, silver bromide, silver chlorobromide, silver bromoiodide, silver chlorobromoiodide or a mixture thereof. The halide composition is selected depending upon the end-use and processing conditions of a particular light-sensitive material, but silver bromide, silver bromoiodide or silver chlorobromoiodide containing 10 mol% or less iodide and 30 mol% or less bromide is particularly preferred.

In the present invention, either of negative emulsions forming a surface latent image and direct reversal emulsions may be used. As the latter type of emulsions, there are internal latent image-forming emulsions and previously fogged direct reversal emulsions:

Internal latent image-forming silver halide emulsions are advantageously used in the present invention. As this type emulsions, there are illustrated, for example, conversion type emulsions described in U.S. Pat. Nos. 2,592,250, 3,206,313, 3,447,927, 3,761,276, 3,935,014, etc., core/shell type emulsions, and emulsions containing foreign metals.

Typical examples of nucleating agents for these types of emulsions are hydrazines described in U.S. Pat. Nos. 2,588,982 and 2,563,785; hydrazides and hydrazones described in U.S. Pat. No. 3,227,552; quaternary salt compounds described in BP No. 1283835, Japanese Patent Publication No. 38164/74, U.S. Pat. Nos. 4,115,122, 3,734,738, 3,719,494, and 3,615,615; sensitizing dyes having a nucleating substituent in the dye molecule are described in U.S. Pat. No. 3,718,470; and thiourea-attached acylhydrazine compounds described in U.S. Pat. Nos. 4,030,925, 4,031,127, 4,245,037, 4,255,511, 4,266,013, 4,276,364, etc.

The silver halide emulsion to be used in the present invention may have, if desired, a color sensitivity expanded with a spectrally sensitizing dye. As the spectrally sensitizing dyes, cyanine dyes, merocyanine dyes, etc. may properly be used.

As the dyes to be formed from the yellow and cyan dye-providing compounds and to be used in the present invention may be completed dyes or dye precursors capable of being converted to dyes in photographic processing steps or additional processing steps. Final image dyes may or may not be chelated with metals. As typical yellow and cyan dye structures useful in the present invention, there are illustrated azo dyes, azomethine dyes, anthraquinone dyes, phthalocyanine dyes, triphenylmethane dyes, indigoid dyes, etc. which may or may not be chelated with metals.

Specific examples of yellow dye-providing compounds usable in the present invention are described in U.S. Pat. Nos. 3,597,200, 3,309,199, 4,013,633, 4,245,028, 4,156,609, 4,139,383, 4,195,992, 4,148,641, 4,148,643, 4,336,322, Japanese Patent Application (OPI) Nos. 114930/76 and 71072/81, Research Disclosure 17630 (1978), ibid., 16475 (1977), etc.

Specific examples of cyan dye-providing compounds usable in the present invention are described in U.S. Pat. Nos. 3,482,972, 3,929,760, 4,013,635, 4,268,625, 4,171,220, 4,242,435, 4,142,891, 4,195,994, 4,147,544, 4,148,642, BP 1,551,138, Japanese Patent Application (OPI) Nos. 99431/79, 8827/77, 47823/78, 143323/78, 99431/79, 71061/81, European Pat. Nos. (EPC) 53037 and 53040, Research Disclosure 17630 (1978), ibid., 16475 (1975), and ibid., 16475 (1977).

Dye-providing compounds having a dye moiety whose light absorption in a light-sensitive element is temporarily shifted may also be used as a kind of dye precursor, and specific examples thereof are described in Japanese Patent Application (OPI) Nos. 53330/80 and 53329/80, U.S. Pat. Nos. 3,336,287, 3,579,334 and 3,982,946, and British Pat. No. 1,467,317.

The dye-providing compounds are coated in amounts of $1 \times 10^{-4}$ to $1 \times 10^{-2}$ mol/m$^2$, preferably $2 \times 10^{-4}$ to $2 \times 10^{-3}$ mol/m$^2$.

The dye-providing compounds to be used in the present invention may be dispersed in a hydrophilic colloid in various manners depending upon their types. For example, compounds having a dissociative group such as a sulfo group or a carboxy group may be dispersed by dissolving them in water or an alkaline aqueous solution, and adding the resulting solution to a hydrophilic colloid solution. On the other hand, compounds which are difficult to solubilize in an aqueous medium and readily soluble in organic solvents may be dispersed by the following processes.

(1) A process of dissolving the compound in a substantially water-insoluble, high-boiling solvent, and adding the resulting solution to a hydrophilic colloidal solution to disperse. This process is described in, for example, U.S. Pat. Nos. 2,322,027, 2,533,514, and 2,801,171. If necessary, a low-boiling solvent or a readily water-soluble organic solvent may be used. These solvents are removed by vaporization through drying or by washing with water.

(2) A process of dissolving the compound in a water-miscible solvent, and dispersing the resulting solution in a hydrophilic colloidal solution.

(3) A process of using an oleophilic polymer in place of, or in combination with, the high-boiling solvent used in (1). This process is described in, for example, U.S. Pat. No. 3,619,195 and West German Pat. No. 1,957,467.

(4) A process of dissolving the compound in a water-miscible solvent, and gradually adding to this solution an aqueous latex to obtain a dispersion wherein the compound is contained in latex particles. This process is described in, for example, Japanese Patent Application (OPI) No. 59943/76.

In addition, oleophilic polymer hydrosols described in, for example, Japanese Patent Publication No. 39835/76 may be added to the hydrophilic colloidal dispersion obtained above.

Dispersing of the dye-providing compound is effectively conducted by using a surfactant as an emulsifying aid. Useful surfactants are described in, for example, foregoing patents and Japanese Patent Publication No. 4923/64 and U.S. Pat. No. 3,676,141.

As the hydrophilic colloids to be used for dispersing the dye-providing compounds used in the present invention, there are illustrated, for example, gelatin, colloidal albumin, casein, cellulose derivatives (e.g., carboxymethyl cellulose, hydroxyethyl cellulose, etc.), sugar derivatives (e.g., agar-agar, sodium alginate, starch derivative, etc.), synthetic hydrophilic colloids (e.g., polyvinyl alcohol, poly-N-vinylpyrrolidone, polyacrylic acid copolymer, polyacrylamide, and their derivatives (e.g., partially hydrolyzed products). If necessary, a compatible mixture of two or more of these colloids may be used. Of these, gelatin is most popularly used. Gelatin may be replaced, wholly or partly, by a synthetic colloid.

The process for obtaining a color diffusion transfer image using the dye-providing compounds is described in "Photographic Science and Engineering", vol. 20, No. 4, pp. 155-164, July/August 1976.

In the above-described process, any silver halide-developing agent may be used that can cross-oxidize the dye-providing compound. Such developing agent may be incorporated in an alkaline processing composition or in a proper layer of a photographic element. Examples of developing agents usable in the present invention are as follows: hydroquinones described in Japanese Patent Application (OPI) No. 16131/81, aminophenols, phenylenediamines, pyrazolidinones (e.g., phenidone, 1-phenyl-3-pyrazolidinone, dimezone (1-phenyl-4,4-dimethyl-3-pyrazolidinone), 1-p-tolyl-4-methyl-4-hydroxymethyl-3-pyrazolidinone, 1-(4'-methoxyphenyl)-4-methyl-4-hydroxymethyl-3-pyrazolidinone, 1-phenyl-4-methyl-4-hydroxymethyl-3-pyrazolidinone, etc.), etc.

Of these, black-and-white developing agents (particularly, pyrazolidinones) generally having the properties of decreasing stain formation in an image-receiving layer are more preferable than color developing agents such as phenylenediamines.

The processing composition to be used for processing the photographic light-sensitive material of the present invention contains base such as sodium hydroxide, potassium hydroxide, sodium carbonate or sodium phosphate and suitably possesses a pH of about 9 or more, preferably 11.5 or more. It may contain an antioxidant such as sodium sulfite, ascorbic acid salt, piperidinohexose reductone, etc. and may contain a silver ion concentration-adjusting agent such as potassium bromide. In addition, a viscosity-increasing compound such as hydroxyethyl cellulose or sodium salt of carboxymethyl cellulose may also be incorporated.

Compounds with the effect of accelerating development or diffusion of dye, such as benzyl alcohol, may be incorporated in the alkaline processing composition.

In the reproduction of natural color by subtractive color photography, a light-sensitive material comprising at least two combinations of an emulsion having a selective sensitivity in a certain wave-length region and a dye-providing compound having a selective spectral absorption in the same wave-length region is used.

Particularly, light-sensitive materials comprising a combination of a blue-sensitive silver halide emulsion and a yellow dye-providing compound, a combination of a green-sensitive emulsion and a magenta dye-providing compound, and a combination of a red-sensitive emulsion and a cyan dye-providing compound are useful. These combination units of emulsion and dye-providing compound may be coated in layers in face-to-face relationship in a light-sensitive material, or may be formed into particles (dye-providing compound and silver halide grains being in the same particles) and be coated as a single layer in a mixed state.

A spacer layer may be provided between an interlayer and a layer containing a dye-providing compound as described in Japanese Patent Application (OPI) No. 52056/80. Also, a silver halide emulsion may be added to the interlayer as described in Japanese Patent Application (OPI) No. 67850/81.

As a mordanting layer, a neutralizing layer, a neutralization rate-controlling layer (timing layer), a processing composition, etc. to be used for the color diffusion transfer process light-sensitive materials of the present invention, those described in, for example, Japanese Patent Application (OPI) No. 64533/77 may be applied.

The polymeric mordants to be used in the present invention are polymers containing secondary and tertiary amino groups, polymers containing N-containing hetero ring moieties, and polymers containing quaternary cation groups thereof, having a molecular weight of not less than 5,000, particularly preferably not less than 10,000.

For example, there are illustrated vinylpyridine polymers and vinylpyridinium cationic polymers disclosed in U.S. Pat. Nos. 2,548,564, 2,484,430, 3,148,061, 3,756,814, etc.; vinylimidazolium cationic polymers disclosed in U.S. Pat. No. 4,124,386, etc.; polymeric mordants cross-linkable with gelatin or the like, disclosed in U.S. Pat. Nos. 3,625,694, 3,859,096, 4,128,538, British Pat. No. 1,277,453, etc.; aqueous sol type mordants disclosed in U.S. Pat. Nos. 3,958,995, 2,721,852, 2,798,063, Japanese Patent Application (OPI) Nos. 115228/79, 145529/79, 126027/79, 155835/79, 17352/81, etc.; water-insoluble mordants disclosed in U.S. Pat. No. 3,898,088, etc.; reactive mordants capable of forming a covalent bond with dyes, disclosed in U.S. Pat. Nos. 4,168,976, 4,201,840, etc.; and mordants disclosed in U.S. Pat. Nos. 3,709,690, 3,788,855, 3,642,482, 3,488,706, 3,557,066, 3,271,147, 3,271,148, Japanese Patent Application (OPI) Nos. 30328/78, 15552/77, 125/78, 1024/78, 107835/78, British Pat. No. 2,064,802, etc.

In addition, those mordants which are described in U.S. Pat. Nos. 2,675,316 and 2,882,156 are also illustrated.

In addition to the foregoing formats, the color photographic light-sensitive material to be used in the present invention may be used in a system of tank-developing a light-sensitive sheet having no image-receiving layer to dissolve away soluble dye compounds and utilize remianing insoluble (non-diffusible) dye compounds. Therefore, the present invention may be applied to any system as long as diffusion of dye is utilized. Of course, it may be applied to conventional color photography.

The present invention will now be described in more detail by the following non-limiting examples of preferred embodiments of the present invention.

EXAMPLE 1

Light-sensitive sheets, image-receiving sheets, and processing solution were prepared as follows. Preparation of light-sensitive sheets:

On a polyethylene terephthalate transparent support were coated, in sequence, the following layers.

(1) A layer containing a magenta dye-releasing redox compound of the following structure ($2 \times 10^{-4}$ mol/m$^2$) tricyclohexyl phosphate (0.08 g/m$^2$), 2,5-di-tert-pentadecylhydroquinone (0.005 g/m$^2$), and gelatin (0.5 g/m$^2$).

(2) A layer containing a silver halide emulsion (0.82 g Ag/m$^2$) and gelatin (0.9 g/m$^2$).

(3) A protective layer containing gelatin (0.5 g/m$^2$).

Preparation of image-receiving sheets:

On a polyethylene terephthalate transparent support was coated an image-receiving layer containing 3.0 g/m$^2$ of copoly[styrene-N-vinylbenzyl-N-methylpiperidinium chloride] and 3.0 g/m$^2$ of gelatin.

Formulation of processing solution:

| | |
|---|---|
| 1-p-Tolyl-4-hydroxymethyl-4-methyl-3-pyrazolidone | 10 g |
| Methylhydroquinone | 0.3 g |
| 5-Methylbenzotriazole | 3.5 g |
| Sodium sulfite (anhydrous) | 0.2 g |
| Na salt of carboxymethyl cellulose | 58 g |
| Potassium hydroxide (28% aq. soln.) | 200 cc |
| Benzyl alcohol | 1.5 cc |
| Carbon black | 150 g |
| Water | 685 cc |

Each of light-sensitive sheets No. 1 to No. 6 was exposed to give a maximum density, then superimposed on the image-receiving sheet. The assembly was passed through a pair of pressure-applying rollers to uniformly spread the above-described processing solution between the two sheets and, after ten minutes, the image-receiving sheet was peeled apart, dipped in a 2% acetic acid solution, then well washed with water. The image-receiving layer was then dipped in MacIlvain's Buffer of pH 5 and air-dried. On this occasion, all image-receiving sheets were uniform and had no stains. Spectral absorption in the visible region of each image-receiving sheet was measured by means of a karry spectrophotometer. In this occasion, a non-processed image-receiving sheet was used as a comparative control. Results thus obtained are shown in Table 1 (hue of transfer image).

On the other hand, non-processed light-sensitive sheets No. 1 to No. 6 were dipped in a fixing solution (30% sodium thiosulfate aqueous solution) for 15 minutes to remove silver, well washed with water, and dried. Spectral absorption in the visible region of each of these samples No. 1 to No. 6 was measured in the above-described manner. Results thus obtained are also given in Table 1 (absorption of coat).

As is clear from Table 1, magenta dye-releasing redox compounds of the present invention provided transfer images having suitable λmax and extremely good bottom shape of absorption wave, thus having excellent hud, and absorption of the compounds in a coat is in a sufficiently short wave-length region. Thus, inconsistent hud problems with the prior art are simultaneously solved.

TABLE 1

| Sample No. | Compound No. | Hue of Transfer Image | | | Absorption of Coat | |
|---|---|---|---|---|---|---|
| | | λmax | Half Band Width* | 4/1 Band Width** | λmax | Filter Effect on Longer Wave-Length End*** |
| 1 | 2 | 548 | 86 | 115 | 520 | 565*[1] |
| 2 | 4 | 552 | 85 | 114 | 524 | 569*[1] |
| 3 | 10 + C**** | 552 | 85 | 114 | 524 | 568*[1] |
| 4 | 13 + C | 553 | 85 | 114 | 523 | 568*[1] |
| 5 | 21 + C | 542 | 89 | 117 | 535 | 572*[1] |
| 6 | A | 559 | 95 | 127 | 549 | 588*[2] |
| 7 | B | 540 | 97 | 125 | 538 | 578*[2] |

*: Half band-width: band-width in nm at one-half the peak density
**: ¼ Band-width: band-width in nm at ¼ the peak density
***: wave-length at which absorption of longer wave-length end is 0.5 (the shorter, the better).
****: Compound C was used in an amount equimolar to that of the dye-providing compound.
*[1] present invention
*[2] comparative compound

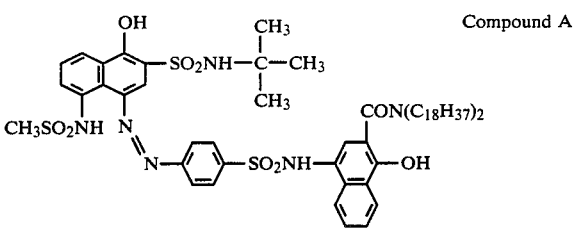

Compound A

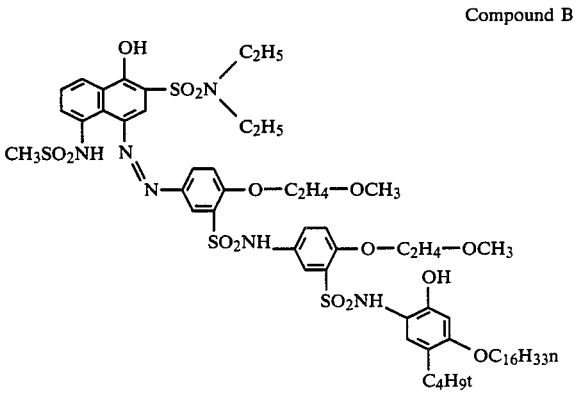

Compound B (ED compound)

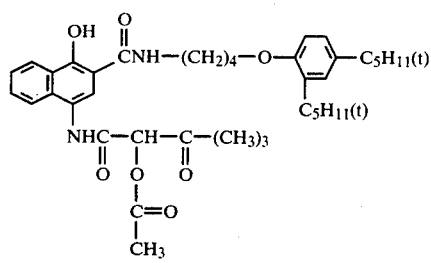

Compound C

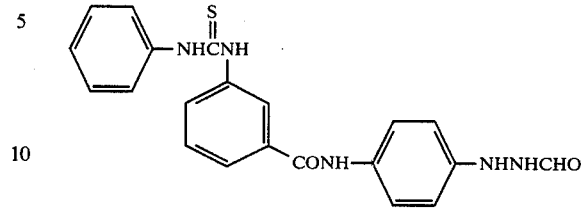

EXAMPLE 2

An integral color diffusion transfer photographic light-sensitive sheet and a cover sheet were prepared as follows.

Preparation of light-sensitive sheet

On a polyethylene terephthalate transparent support were coated, in sequence, the following layers to prepare light-sensitive sheets 8 to 11.

(1) An image-receiving layer containing 3.0 g/m² of copoly-[styrene-N-vinylbenzyl-N-methyl-piperidinium chloride] and 3.0 g/m² of gelatin.
(2) A white reflecting layer containing 20 g/m² of titanium dioxide and 2.0 g/m² of gelatin.
(3) A light barrier layer containing 2.0 g/m² of carbon black and 1.5 g/m² of gelatin.
(4) A layer containing 0.44 g/m² of a cyan dye-releasing redox compound of the following formula, 0.09 g/m²

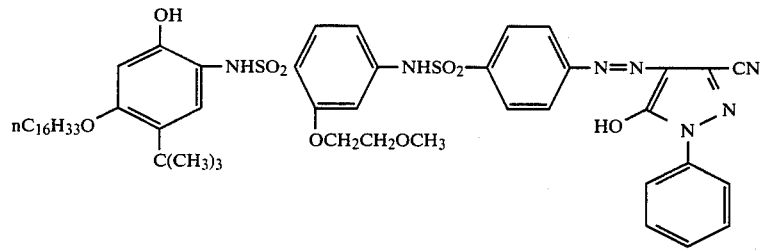

of tricyclohexyl phosphate, 0.008 g/m² of 2,5-di-t-pentadecylhydroquinone, and 0.8 g/m² of gelatin.

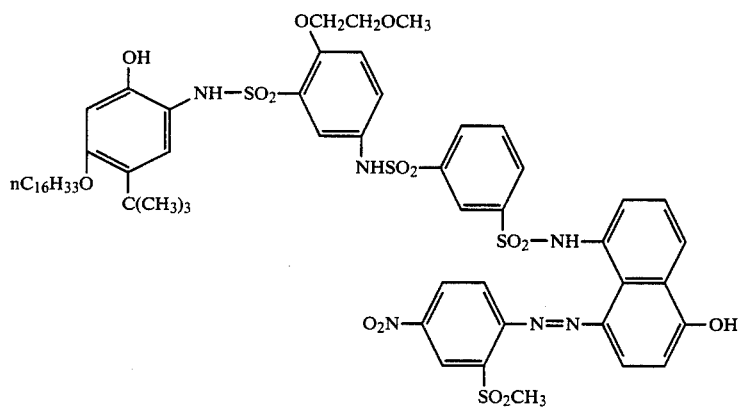

(5) A red-sensitive emulsion layer containing a red-sensitive, internal latent image-forming direct positive silver bromide emulsion (1.03 g Ag/m²), 1.2 g/m² of gelatin, 0.04 mg/m² of a nucleating agent of the following formula, and 0.13 g/m² of 2-sulfo-5-n-pentadecylhydroquinone sodium salt.

(6) A layer containing 0.43 g/m² of 2,5-di-t-pentadecylhydroquinone, 0.1 g/m² of trihexyl phosphate, and 0.4 g/m² of gelatin.
(7) A layer containing $3.0 \times 10^{-4}$ mol/m² of a magenta dye-releasing redox compound shown in Table 2, tricyclohexyl phosphate (0.08 g/m²), 2,5-di-tert-pentadecylhydroquinone (0.009 g/m²), and gelatin (0.5 g/m²).
(8) A green-sensitive emulsion layer containing a green-sensitive internal latent image-forming direct positive type silver bromide emulsion (0.82 g Ag/m²), gelatin (0.9 g/m²), the same nucleating agent as in layer (5) (0.03 mg/m²), and 2-sulfo-5-n-pentadecylhydroquinone sodium salt (0.08 g/m²).
(9) The same layer as (6).
(10) A layer containing a yellow dye-releasing redox compound of the following structure (0.53 g/m²), tricyclohexyl phosphate (0.13 g/m²), 2,5-di-t-pentadecylhydroquinone (0.014 g/m²), and gelatin (0.7 g/m²).

(11) A blue-sensitive emulsion layer containing a blue-sensitive, internal latent image-forming direct positive silver bromide emulsion (1.09 g Ag/m²), gelatin (1.1 g/m²), the same nucleating agent as in layer (5)

(0.04 mg/m$^2$), and 2-sulfo-5-n-pentadecylhydroquinone sodium salt (0.07 g/m$^2$).

(12) An ultraviolet ray-absorbing layer containing the following UV ray absorbents both in amounts of $4 \times 10$ mol/m$^2$, and 0.30 g/m$^2$ of gelatin.

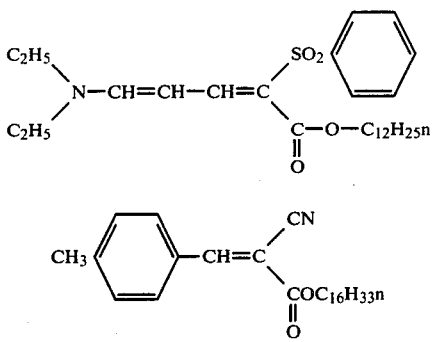

(13) A protective layer containing polymethyl methacrylate latex (mean particle size: 4μ; 0.10 g/m$^2$), gelatin (0.8 g/m$^2$), and a hardener of triacryloyltriazine (0.02 g/m$^2$).

Preparation of cover sheet:

On a transparent polyethylene terephthalate support were coated, in sequence, the following layers (1') to (3') to prepare a cover sheet.

(1') A layer containing a copolymer of acrylic acid/butyl acrylate (80/20 by weight) (22 g/m$^2$) and 1,4-bis(2,3-epoxypropoxy)-butane (0.44 g/m$^2$).

(2') A layer containing acetyl cellulose (39.4 g of acetyl group being produced by hydrolysis of 100 g of acetyl cellulose) (3.8 g/m$^2$), a copolymer of styrene/maleic anhydride (60/40 by weight) (molecular weight: about 50,000) ring-opened with methanol (0.23 g/m$^2$), and 5-(2-cyano-1-methylethylthio)-1-phenyltetrazole (0.154 g/m$^2$).

(3') A 2-μ thick layer formed by coating a mixture of a styrene/n-butyl acrylate/acrylic acid/N-methylol acrylamide (49.7/42.3/3/5 by weight) copolymer latex and a methyl methacrylate/acrylic acid/N-methylol acrylamide (93/4/3 by weight) copolymer latex (solid ratio of the former latex to the latter latex being 6:4).

Each of the thus prepared light-sensitive sheets 8 to 11 was processed by spreading the processing solution used in Example 1 using the cover sheet and with the aid of rollers. Additionally, the sheets were previously exposed to red light to give $D_B$ of 1.7, $D_G$ of 2.1, and $D_R$ of 0.25 (Dmin). The thus obtained "red" was observed to evaluate the hue. The results thus obtained are given in Table 2.

Next, light-sensitive sheets 8 to 11 were exposed using a continuous wedge, and processed by spreading the processing solution in the same manner as described above, followed by measuring density using a color densitometer. Dmax values and sensitivities were read from the data and tabulated in Table 2. Sensitivity was relatively compared with respect to the point of $D = 1.0$.

Each of light-sensitive sheets 8 to 11 was located in a camera, and photographing procedure was repeated under a light source of a 4,800° K. tungsten lamp to determine, with each sample, a photographing filter for correctly reproducing gray gradation. Subsequently, the light source was changed to a white fluorescent lamp with maintaining the conditions for respective light-sensitive materials, and photographing procedure was conducted, followed by the same spreading procedure. Results of evaluating color reproduction by observation of the samples are tabulated in Table 2.

As is clear from Table 2, light-sensitive materials using the magenta dye-releasing redox compounds of the present invention have remarkably improved effects in the following points:

(1) red hue is markedly excellent, and a vivid and clean, ideal red color can be reproduced;
(2) sensitivity of a red-sensitive emulsion is high; and
(3) resulting images are not tinted with cyan even under a fluorescent lamp, and good color can be reproduced for a wide variety of light sources.

TABLE 2

| Sample No. | Compound No. | Tint of Red | Cyan Sensitivity $(S_{1.0})$* Difference from Yellow | Tint Obtained by Photographing under Fluorescent Lamp** | |
|---|---|---|---|---|---|
| 8 | 4 | true red, vivid and clear | +0.10 | slightly tinted with cyan | present invention |
| 9 | 5 | true red, vivid and clear | +0.12 | slightly tinted with cyan | present invention |
| 10 | A | dark red, turbid red | −0.12 | strongly tinted with cyan | for comparison |
| 11 | B | vermilion, weak | 0 | strongly tinted with cyan | for comparison |

*The greater the value, the better the sample.
**Grayish tint is preferred.

EXAMPLE 3

Transfer rate and sharpness (MTF; Modular Transfer Function; see T. James, "The Theory of Photographic Process", 4th. Edition, Mcmillan, New York, pp. 604–607) were measured with each light-sensitive sheet prepared in Example 2.

G density change versus time was measured starting from immediately after spread-processing of light-sensitive sheets 8 to 11 using a Macbeth densitometer, and time required for the density to reach 50% of final density was determined. The results are tabulated in Table 3.

Then, light-sensitive sheets 8 to 11 were exposed through a frequency-varied wedge for testing resolving power, processed by spreading the processing solution, then subjected to microdensitometry. Space frequency at which MTF of magenta was 0.5 was determined from the thus obtained data, and was tabulated in Table 3.

It is seen from Table 3 that light-sensitive sheets of the present invention showed fast transfer rate and excellent sharpness as compared with conventional sheets.

TABLE 3

| Light-sensitive Sheet No. | Compound No. | Transfer Rate* (Time Required for Attaining 50% Density) | Sharpness** (MTF 50%) | |
|---|---|---|---|---|
| 8 | 4 | 40 sec. | 5.0 lines/mm | present invention |
| 9 | 5 | 42 sec. | 6.1 | present invention |
| 10 | A | 48 sec. | 4.7 | for comparison |
| 11 | B | 47 sec. | 4.5 | for comparison |

*The shorter the time, the faster the rate.
**Greater value means better sharpness.

EXAMPLE 4

Peel-apart type color diffusion transfer light-sensitive sheets and image-receiving sheets were prepared as follows.

Preparation of light-sensitive sheet:

On a polyethylene terephthalate support were coated, in sequence, the following layers to prepare light-sensitive sheets 12 to 16.

(1) A layer containing $1 \times 10^{-4}$ mol/m$^2$ of a cyan dye-providing compound shown below, $1 \times 10^{-4}$ mol/m$^2$ of compound C (ED compound), 0.1 g/m$^2$ of N,N-diethyllaurylamide, and 0.8 g/m$^2$ of gelatin.

(2) A red-sensitive silver bromide emulsion layer (a layer containing 0.6 g silver/m$^2$ and 0.6 g/m$^2$ of gelatin).

(3) A layer containing 0.5 g/m$^2$ of 2,5-di-t-pentadecyl-hydroquinone and 0.4 g/m$^2$ of gelatin.

(4) A layer containing $2 \times 10^{-4}$ mol/m$^2$ of a magenta dye-providing compound shown in Table 4, $2 \times 10^{-4}$ mol/m$^2$ of compound C (an ED compound), 0.1 g/m$^2$ of N,N-diethyllaurylamide, and 0.8 g/m$^2$ of gelatin.

(5) A green-sensitive silver bromide emulsion layer (a layer containing 0.6 g silver/m$^2$ and 0.4 g/m$^2$ of gelatin).

(6) The same layer as layer (3).

(7) A layer containing $3 \times 10^{-4}$ mol/m$^2$ of the following yellow dye-providing compound, $3 \times 10^{-4}$ mol/m$^2$ of compound C (an ED compound), 0.1 g/m$^2$ of N,N-diethyllaurylamide, and 0.8 g/m$^2$ of gelatin.

(8) A blue-sensitive silver bromide emulsion layer (a layer containing 0.6 g/m$^2$ of silver and 0.4 g/m$^2$ of gelatin).

(9) The same layer as layer (12) in Example 2.

(10) The same layer as layer (13) in Example 2.

Preparation of image-receiving sheet:

Reflective, image-receiving sheets were prepared by coating, in sequence, the following layers on a white paper support.

(1') A neutralizing layer containing a copolymer of acrylic acid/butyl acrylate (80/20 by weight) (10 g/m$^2$) and 1,4-bis(2,3-epoxypropoxy-butane (0.3 g/m$^2$).

(2') A neutralization timing layer containing 3.8 g/m$^2$ of acetyl cellulose (hydrolysis of 100 g of the acetyl cellulose yielding 39.4 g of acetyl group) and 5-(2-cyano-1-methylethylthio)-1-phenyltetrazole (0.15 g/m$^2$).

(3') An image-receiving layer containing 3.0 g/m$^2$ of copoly[styrene/N-vinylbenzyl-N-methyl-piperidinium chloride] and 3.0 g/m$^2$ of gelatin.

(4') A protective layer containing 0.15 g/m$^2$ of gelatin.

The thus prepared light-sensitive sheets 12 to 16 were exposed through a red, blue or green filter with gray gradation, then spread-processed between rollers using the same processing solution as used in Example 1. After two minutes, the image-receiving sheets were peeled apart to obtain images with good color separation (red, blue, and green) and good gray gradation. Red color reproduction was particularly excellent, vivid and clean red color being reproduced. Maximum densities (Dmax) and minimum densities (Dmin) of respective samples are shown in Table 4.

TABLE 4

| Sample No. | Magenta Dye-providing Compound | Dmax | | | Dmin | | |
|---|---|---|---|---|---|---|---|
| | | B | G | R | B | G | R |
| 12 | 10 | 1.72 | 2.15 | 2.30 | 0.10 | 0.12 | 0.15 |
| 13 | 13 | 1.69 | 2.15 | 2.31 | 0.10 | 0.12 | 0.15 |
| 14 | 17 | 1.71 | 2.10 | 2.28 | 0.10 | 0.12 | 0.15 |
| 15 | 20 | 1.75 | 2.27 | 2.29 | 0.10 | 0.13 | 0.16 |
| 16 | 24* | 1.77 | 2.05 | 2.30 | 0.11 | 0.12 | 0.15 |

*With light-sensitive sheet 16 using magenta dye-providing compound 24, no ED compound (Compound C) was incorporated.

While the invention has been described in detail and with reference to specific embodiments thereof, it will be apparent to one skilled in the art that various changes and modifications can be made therein without from the spirit and scope thereof.

What is claimed is:

1. A color photographic light-sensitive material which contains at least one light-sensitive negative working silver halide emulsion layer and associated with at least one of said emulsion layers at least one positive-working dye-providing compound represented by the following general formula (I):

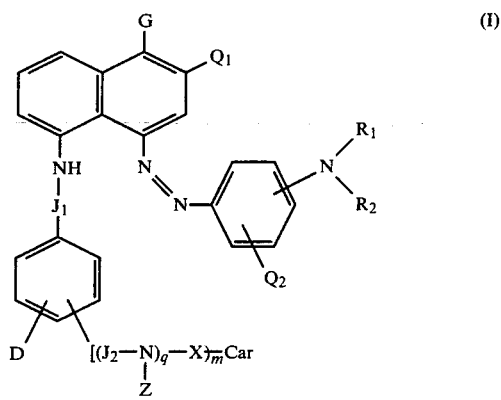

wherein
- $Q_1$ represents a hydrogen atom, a halogen atom, a sulfamoyl group of $-SO_2NR_3R_4$, an $-SO_2R_a$ group, a $-COOR_3$ group or a $-CONR_3R_4$ group, wherein $R_3$ and $R_4$ may be the same or different and each represents a hydrogen atom or $R_a$ and wherein Ra represents an alkyl group, a substituted alkyl group, an aralkyl group, a substituted aralkyl group, an aryl group or a substituted aryl group, or wherein $R_3$ and $R_4$ are bonded together directly or through a nitrogen or oxygen atom to form a ring;
- G represents a hydroxy group, a salt thereof, or $-O-PR$, wherein PR represents a protective group for $-O-$ undergoing cleavage of $O-PR$ bond under alkaline conditions;
- $R_1$ and $R_2$ may be the same or different and each represents an alkyl group, a substituted alkyl group, an aryl group or a substituted aryl group, or $R_1$ and $R_2$ together represent atoms necessary for forming a 5- or 6-membered hetero ring;
- $Q_2$ represents a sulfonic acid group, a salt thereof, or a sulfamoyl group represented by $-SO_2NR_5R_6$, wherein $R_5$ and $R_6$ are the same as defined for $R_3$ and $R_4$ in $Q_1$;
- $J_1$ and $J_2$ each represents a sulfonyl group or a carbonyl group;
- D represents a hydrogen atom, a halogen atom, a carboxyl group, a sulfo group, an alkyl group, a substituted alkyl group, an alkoxy group, a substituted alkoxy group, an aryl group, a substituted aryl group, or an amino group represented by $-NR_7R_8$, wherein $R_7$ and $R_8$ are the same as defined for $R_3$ and $R_4$ in $Q_1$;
- Z represents a hydrogen atom, an alkyl group or a substituted alkyl group;
- X represents a bivalent linking group of the formula $-A_1-L_n-(A_2)_p-$, wherein $A_1$ and $A_2$ may be the same or different and each represents an alkylene group, a substituted alkylene group, an aralkylene group, a substituted aralkylene group, a phenylene group or a substituted phenylene group, L represents a bivalent group selected from oxy, carbonyl, carboxamido, carbamoyl, sulfonamido, sulfamoyl, sulfinyl and sulfonyl, and p and n each represents 0 or 1;
- m and q each represents 0 or 1; and
- Car represents a positive-working quinone moiety which undergoes cleavage in portions where no development of silver has taken place and does not undergo cleavage in portions where development of silver has taken place and, as a function of development, forms or releases a substance having an oxygen or sulfur atom as an end atom and having a mobility different from that of the dye providing compound.

2. A color photographic light-sensitive material as claimed in claim 1, wherein

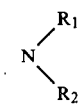

is in the 4- or 6-position with respect to the azo group.

3. A color photographic light-sensitive material as claimed in claim 1, wherein

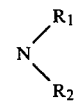

is a morpholino group.

4. A color photographic light-sensitive material as claimed in claim 1, wherein $R_1$ and $R_2$, which may be the same or different, represents an alkyl group containing 1 to 6 carbon atoms, a substituted alkyl group containing 1 to 10 carbon atoms and substituted by an alkoxy group, a halogen atom, a hydroxy group, an amino group, or an alkyl amino group or when $R_1$ and $R_2$ are bound together to form a ring, the ring is a 5- or 6-membered ring formed from alkylene groups or the ring is completed with carbon chains containing an oxygen atom or a nitrogen atom.

5. A color photographic light-sensitive material as claimed in claim 1, wherein $Q_1$ represents a sulfamoyl group of $-SO_2NR_3R_4$, and $R_3$ and $R_4$, which may be the same or different each represents a hydrogen atom, an alkyl group containing 1 to 10 carbon atoms, a substituted alkyl group containing 1 to 10 carbon atoms in the alkyl residue, an aralkyl group, a phenyl group, or a substituted phenyl group containing 6 to 9 carbon atoms, or, when $R_3$ and $R_4$ are bound together to form a ring, the ring is a 5- or 6-membered hetero ring completed with alkylene groups or carbon chains containing an oxygen atom or a nitrogen atom.

6. A color photographic light-sensitive material as claimed in claim 4, wherein at least one of $R_3$ and $R_4$ is branched.

7. A color photographic light-sensitive material as claimed in claim 1, wherein $Q_1$ represents $-CONR_3R_4$, and $R_3$ and $R_4$, which may be the same or different, each represents a hydrogen atom, an alkyl group containing 1 to 10 carbon atoms, a substituted alkyl group containing 1 to 10 carbon atoms in the alkyl residue, an aralkyl group, a phenyl group, or a substituted phenyl group containing 6 to 9 carbon atoms, or, when $R_3$ and $R_4$ are bound together to form a ring, the ring is a 5- or 6-membered hetero ring completed with alkylene groups or carbon chains containing an oxygen atom or a nitrogen atom.

8. A color photographic light-sensitive material as claimed in claim 1, wherein $Q_2$ represents $-SO_2NR_5R_6$, wherein total carbon numbers of $R_5$ and $R_6$ is 4 or less.

9. A color photographic light-sensitive material as claimed in claim 1, wherein $Q_2$ represents $-SO_2NR_5R_6$, wherein total carbon numbers of $R_5$ and $R_6$ is 2 or less and at least one of $R_5$ and $R_6$ is a hydrogen atom.

10. A color photographic light-sensitive material as claimed in claim 1, wherein G represents a hydroxy group, an alkali metal salt thereof, an ammonium salt thereof, or an acyloxy group represented by

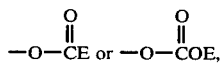

wherein E represents an alkyl group, a substituted alkyl group, a phenyl group or a substituted phenyl group.

11. A color photographic light-sensitive material as claimed in claim 1, wherein both $J_1$ and $J_2$ represent a sulfonyl group.

12. A color photographic light-sensitive material as claimed in claim 1, wherein Z is a hydrogen atom.

13. A color photographic light-sensitive material as claimed in claim 1, wherein the substituted phenyl group represented by $A_1$ or $A_2$ has 6 to 12 carbon atoms and has as a substituent, an alkoxy group, an alkoxyalkoxy group, an alkyl group, an amino group or a substituted amino group.

14. A color photographic light-sensitive material as claimed in claim 1, wherein D is a hydrogen atom.

15. A color photographic light-sensitive material as claimed in claim 1, wherein n represents 1 and p represents 0.

16. A color photographic light-sensitive material as claimed in claim 1, wherein q and m represent 1.

17. A color photographic light-sensitive material as claimed in claim 1, wherein m represents 0.

18. A color photographic light-sensitive material as claimed in claim 1, wherein Car is a N-substituted sulfamoyl group wherein the substituent is an aryl group.

* * * * *